US010280778B2

(12) United States Patent
Rogers et al.

(10) Patent No.: US 10,280,778 B2
(45) Date of Patent: May 7, 2019

(54) ASSEMBLY FOR SEALING A GAP BETWEEN COMPONENTS OF A TURBINE ENGINE

(71) Applicant: United Technologies Corporation, Hartford, CT (US)

(72) Inventors: Mark J. Rogers, Kennebunk, ME (US); Timothy M. Davis, Kennebunk, ME (US); Mark Broomer, Portsmouth, NH (US); Kevin W. White, Jupiter, FL (US); Craig McGarrah, Southington, CT (US); Carson A. Roy Thill, South Berwick, ME (US)

(73) Assignee: United Technologies Corporation, Farmington, CT (US)

( * ) Notice: Subject to any disclaimer, the term of this patent is extended or adjusted under 35 U.S.C. 154(b) by 722 days.

(21) Appl. No.: 14/770,678

(22) PCT Filed: Feb. 24, 2014

(86) PCT No.: PCT/US2014/018000
§ 371 (c)(1),
(2) Date: Aug. 26, 2015

(87) PCT Pub. No.: WO2014/133958
PCT Pub. Date: Sep. 4, 2014

(65) Prior Publication Data
US 2016/0017738 A1    Jan. 21, 2016

Related U.S. Application Data

(60) Provisional application No. 61/770,162, filed on Feb. 27, 2013.

(51) Int. Cl.
*F01D 11/00* (2006.01)
*F02C 7/28* (2006.01)
(Continued)

(52) U.S. Cl.
CPC ............ *F01D 11/005* (2013.01); *F01D 25/26* (2013.01); *F02C 7/28* (2013.01); *F16J 15/061* (2013.01);
(Continued)

(58) Field of Classification Search
CPC .......... F01D 11/005; F01D 25/26; F01D 9/04; F02C 7/28; F05D 2220/30; F05D 2240/11;
(Continued)

(56) References Cited

U.S. PATENT DOCUMENTS 3,938,906 A * 2/1976 Michel .................. F01D 11/005
415/139
5,333,993 A    8/1994 Stueber et al.
(Continued)

OTHER PUBLICATIONS

Extended EP Search Report dated Sep. 30, 2016.

*Primary Examiner* — Mark A Laurenzi
*Assistant Examiner* — Paul W Thiede
(74) *Attorney, Agent, or Firm* — O'Shea Getz P.C.

(57) ABSTRACT

An assembly for a turbine engine includes a turbine engine first component, a turbine engine second component and a seal assembly. The first component includes a groove and a groove surface. The second component includes a tongue that extends into the groove to a tongue surface. The seal assembly at least partially seals a gap between the groove surface and the tongue surface. The seal assembly includes a rope seal and a clip that attaches the rope seal to the tongue. The rope seal is arranged within the groove between the groove surface and the tongue surface.

10 Claims, 4 Drawing Sheets

(51) Int. Cl.
*F16J 15/08* (2006.01)
*F16J 15/06* (2006.01)
*F01D 25/26* (2006.01)

(52) U.S. Cl.
CPC ....... *F16J 15/0812* (2013.01); *F05D 2220/30* (2013.01); *F05D 2240/11* (2013.01); *F05D 2240/55* (2013.01); *F05D 2260/97* (2013.01)

(58) Field of Classification Search
CPC . F05D 2240/55; F05D 2260/97; F16J 15/061; F16J 15/0812
USPC .................................. 415/139, 174.2, 1, 116
See application file for complete search history.

(56) References Cited

U.S. PATENT DOCUMENTS

| | | | |
|---|---|---|---|
| 5,738,490 A | 4/1998 | Pizzi | |
| 2005/0129499 A1* | 6/2005 | Morris | F01D 9/04 415/1 |
| 2005/0141989 A1* | 6/2005 | Sayegh | F01D 9/04 415/116 |
| 2006/0038358 A1 | 2/2006 | James | |
| 2007/0036644 A1 | 2/2007 | Harper | |
| 2008/0063514 A1 | 3/2008 | Durocher et al. | |
| 2012/0128498 A1 | 5/2012 | Basiletti et al. | |

* cited by examiner

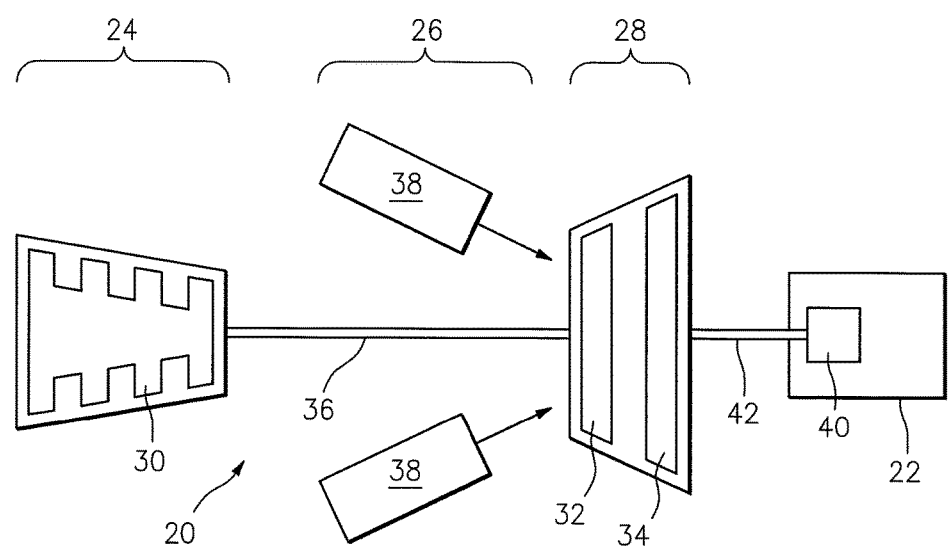
FIG. 1
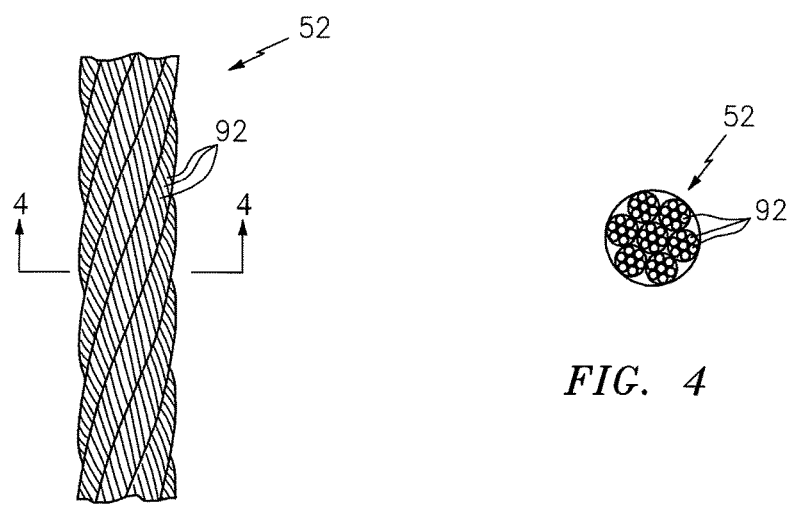
FIG. 3
FIG. 4

ASSEMBLY FOR SEALING A GAP BETWEEN COMPONENTS OF A TURBINE ENGINE

This application claims priority to PCT Patent Application No. PCT/US14/18000 filed Feb. 24, 2014, which claims priority to U.S. Patent Appln. No. 61/770,162 filed Feb. 27, 2013.

BACKGROUND OF THE INVENTION

1. Technical Field

This disclosure relates generally to a turbine engine and, more particularly, to an assembly for sealing a gap between components of a turbine engine.

2. Background Information

Various types of seals are known in the art for reducing air leakage between components of a turbine engine. A rope seal, for example, may be arranged to seal a gap between adjacent turbine engine cases.

A typical rope seal is constructed from a plurality of metal wires that are woven together into a bundle. Such a rope seal is relatively flexible and therefore may be difficult to locate during turbine engine assembly. A portion of the rope seal, for example, may slip out of a locating groove in one of the turbine engine cases where the case is subject to vibrations and/or jarring movements. The dislocated rope seal may become pinched between the cases, which may damage and/or reduce the sealing effectiveness of the rope seal.

There is a need in the art for an improved assembly for sealing a gap between adjacent components of a turbine engine.

SUMMARY OF THE DISCLOSURE

According to an aspect of the invention, an assembly for a turbine engine is provided that includes a turbine engine first component, a turbine engine second component and a seal assembly. The first component includes a groove and a groove surface. The second component includes a tongue that extends into the groove to a tongue surface. The seal assembly at least partially seals a gap between the groove surface and the tongue surface. The seal assembly includes a rope seal and a clip that attaches the rope seal to the tongue. The rope seal is arranged within the groove between the groove surface and the tongue surface.

According to another aspect of the invention, another assembly for a turbine engine is provided that includes a turbine engine first component, a turbine engine second component and a seal assembly. The first component includes an annular groove surface that at least partially defines a groove. The second component includes a tongue that extends along an axis into the groove to an annular tongue surface. The seal assembly includes a seal element and a clip that attaches the seal element to the tongue. The seal element is arranged within the groove, and engaged axially between the tongue surface and the clip. The clip is engaged axially between the seal element and the groove surface.

According to still another aspect of the invention, another assembly for a turbine engine is provided that includes a turbine engine first component, a turbine engine second component and a seal assembly. The first component includes a first surface, and the second component includes a second surface. The seal assembly at least partially seals a gap between the first surface and the second surface. The seal assembly includes a rope seal and a clip that attaches the rope seal to the second component. The rope seal and the clip extend circumferentially at least partially around an axis. The rope seal is engaged axially between the second surface and the clip. The clip is engaged axially between the rope seal and the first surface.

The seal element may be configured as or otherwise include a rope seal, or any other type of seal element.

The first surface may be configured as or otherwise include a groove surface that at least partially defines a groove in the first component. The second surface may be configured as or otherwise include a tongue surface, where the second component includes a tongue that extends axially into the groove to the tongue surface. The clip may attach the rope seal (or seal element) to the tongue.

The rope seal (or seal element) may extend circumferentially within the groove at least partially around an axis. The clip may also or alternatively extend circumferentially within the groove at least partially around the axis.

The rope seal (or seal element) may be engaged axially between the tongue surface and the clip. The clip may be engaged axially between the rope seal and the groove surface.

The groove surface may be configured as or otherwise include an annular groove surface. The tongue surface may also or alternatively be configured as or otherwise include an annular tongue surface. The rope seal (or seal element) may also or alternatively be configured as or otherwise include a substantially full hoop body.

The clip may be configured as or otherwise include a substantially full hoop body. Alternatively, the clip may be one of a plurality of clips that attach the rope seal to the tongue.

The clip may include a first clamp portion, a second clamp portion and a spring portion, which may connect the first clamp portion to the second clamp portion. The tongue may be clamped between the first clamp portion and the second clamp portion. The rope seal (or seal element) may be engaged between the tongue surface (or first surface) and the spring portion. The spring portion may be engaged between the rope seal (or seal element) and the groove surface (or first surface).

The groove surface may extend between opposing side groove surfaces. The spring portion may engage one of the side groove surfaces.

The assembly may include a turbine engine third component that is connected to the clip; e.g., the first clamp portion.

The first component may be configured as or otherwise include a turbine engine first case. The second component may also or alternatively be configured as or otherwise include a turbine engine second case. The third component may also or alternatively be configured as or otherwise include a blade outer air seal (BOAS), which may be arranged within the second case.

The clip may be configured as or otherwise include a c-clip.

The foregoing features and the operation of the invention will become more apparent in light of the following description and the accompanying drawings.

BRIEF DESCRIPTION OF THE DRAWINGS

FIG. 1 is a schematic illustration of an industrial turbine engine configured with an electrical generator;

FIG. 3 is an illustration of a longitudinal portion of a rope seal;

FIG. 4 is a cross-sectional illustration of the rope seal of FIG. 3;

DETAILED DESCRIPTION OF THE INVENTION

Figure 2:
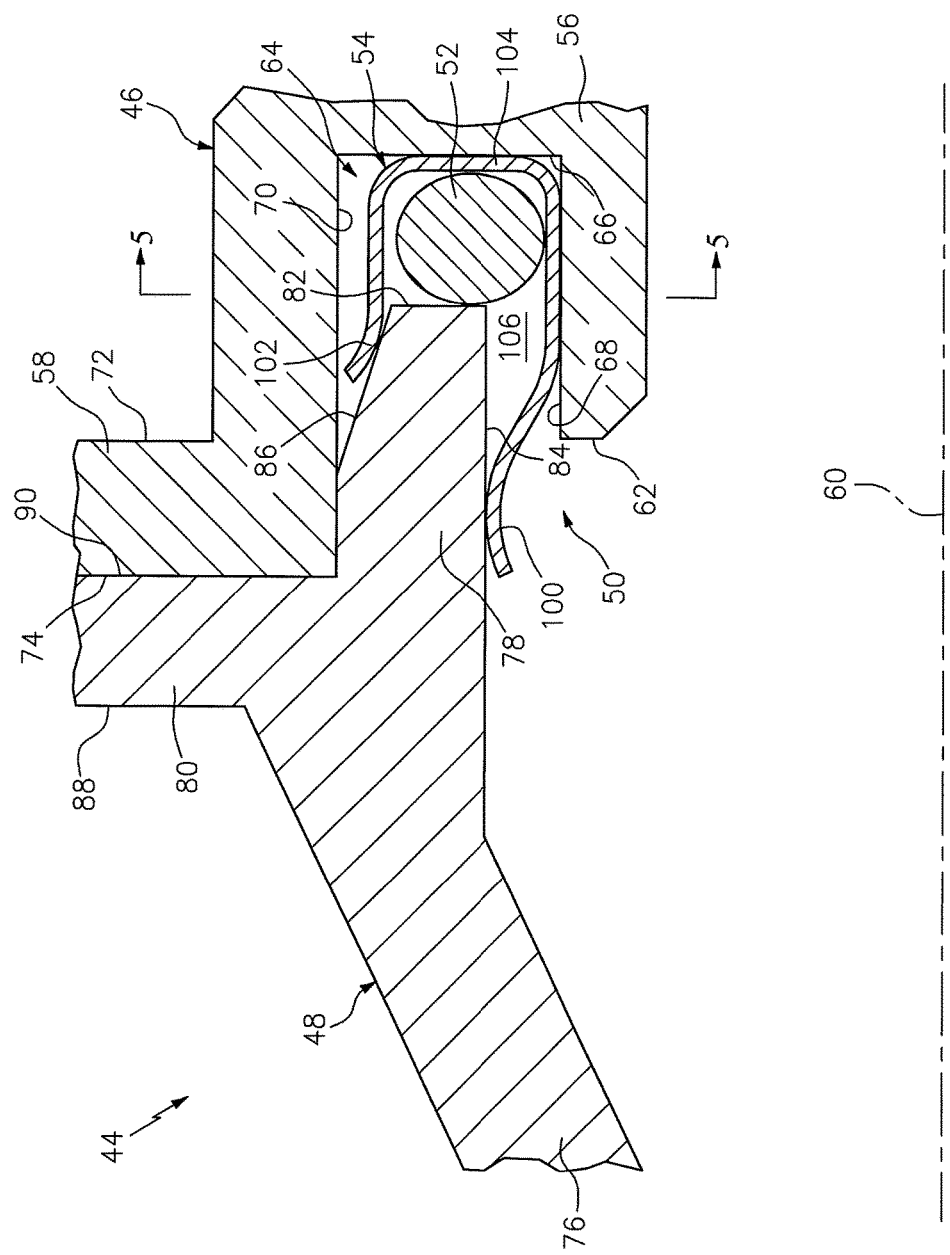
FIG. 2 is a side sectional illustration of a portion of an assembly for the turbine engine of FIG. 1.

FIG. 1 is a schematic illustration of an industrial turbine engine 20 configured with an electrical generator 22. The turbine engine 20 may be configured for a land based installation, and includes a compressor section 24, a combustor section 26 and a turbine section 28. The compressor section 24 includes at least one compressor rotor 30. The turbine section 28 includes one or more turbine rotors 32 and 34. The compressor rotor 30 is connected to and driven by the turbine rotor 32 through an engine shaft 36. The combustor section 26 includes one or more combustors 38, which are arranged about the engine shaft 36. The combustors 38 are fluidly coupled between the compressor section 24 and the turbine section 28. The electrical generator 22 includes at least one generator rotor 40, which is connected to and driven by the turbine rotor 34 through a shaft 42.

FIG. 2 is a side sectional illustration of a portion of an assembly 44 for the turbine engine 20 of FIG. 1. The assembly 44 includes a stator turbine engine first component 46, a stator turbine engine second component 48 and a seal assembly 50, which at least partially seals a gap between the first component 46 and the second component 48. The seal assembly 50 includes a seal element 52 and one or more clips 54.

Referring to FIGS. 1 and 2, the first component 46 may be configured as a turbine engine case that houses, for example, at least a portion of the turbine rotor 34. Referring to FIG. 2, the first component 46 includes a body 56 (e.g., a tubular shell) and a flange 58 (e.g., an annular flange). The body 56 extends along an axis 60 to a body end 62. The body 56 includes a groove 64, which extends axially into the body 56 from the body end 62 to an end groove surface 66 (e.g., an annular groove surface). The groove 64 and the end groove surface 66 extend radially within the body 56 between an inner side groove surface 68 and an outer side groove surface 70. The groove 64 extends circumferentially within the body 56 at least partially (e.g., completely) around the axis 60. The flange 58 is located at the body end 62, and extends radially out from the body 56. The flange 58 extends axially between a first flange surface 72 and a second flange surface 74. The flange 58 extends circumferentially at least partially (e.g., completely) around the axis 60.

Referring to FIGS. 1 and 2, the second component 48 may be configured as a turbine engine case that houses, for example, at least a portion of the turbine rotor 32. Referring to FIG. 2, the second component 48 includes a body 76 (e.g., a tubular shell), a tongue 78 and a flange 80 (e.g., an annular flange). The tongue 78 may be configured as an annular rim of the body 76. The tongue 78, for example, extends axially from the body 76 to an end tongue surface 82 (e.g., an annular tongue surface). The tongue 78 and the end tongue surface 82 extend radially between an inner side tongue surface 84 and an outer side tongue surface 86, which extends axially to the flange 80. The tongue 78 extends circumferentially at least partially (e.g., completely) around the axis 60. The flange 80 extends radially out from the body 76. The flange 80 extends axially between a first flange surface 88 and a second flange surface 90. The flange 80 extends circumferentially at least partially (e.g., completely) around the axis 60.

Figure 5:
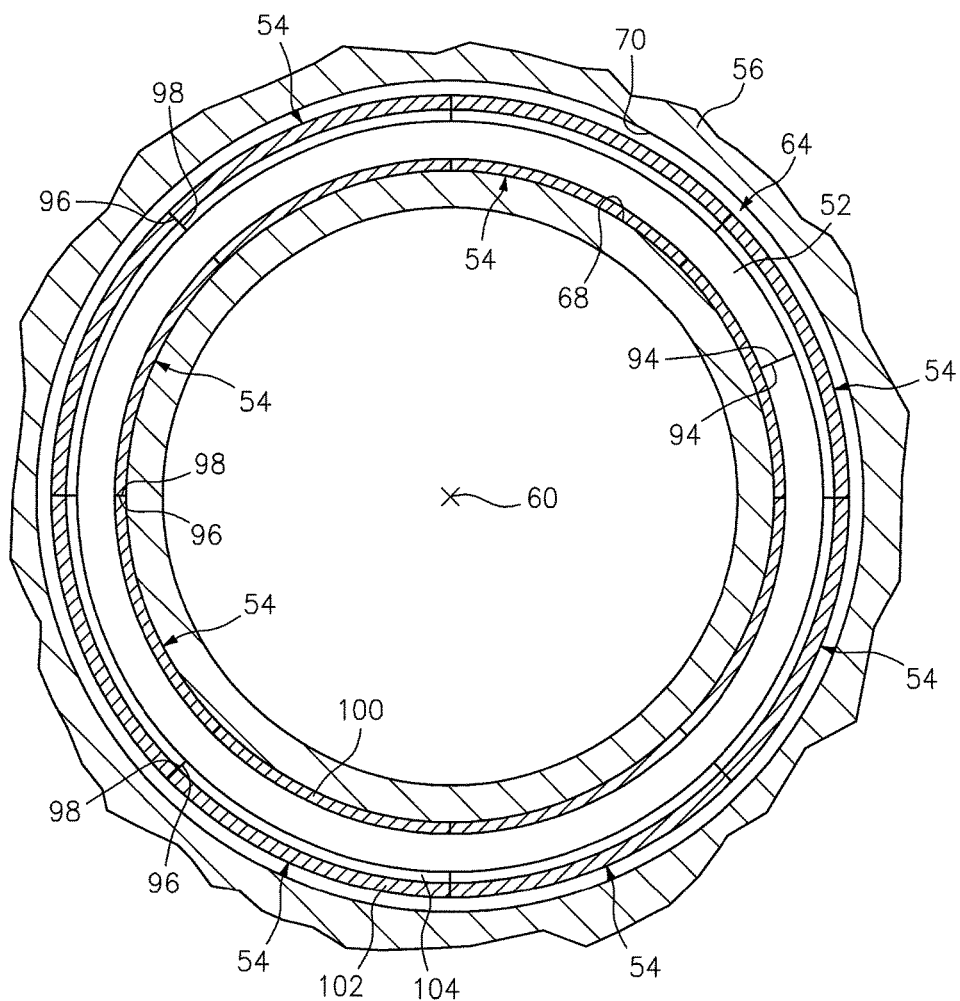
FIG. 5 is a cross-sectional illustration of the assembly of FIG. 2.

Referring to FIGS. 3 and 4, the seal element 52 may be configured as a rope seal. The seal element 52, for example, may include a plurality of stands of seal element material 92 (e.g., metal wires) that are woven, braded and/or otherwise arranged together to form one or more seal element bundles. Referring to FIG. 5, the seal element 52 may have a substantially full hoop body that extends circumferentially around the axis 60. For example, referring to FIGS. 3 to 5, ends 94 of the seal element material 92 may be spliced or otherwise fastened (e.g., bonded) together. Alternatively, one of the ends 94 may be located adjacent or proximate the other end 94. The present invention, however, is not limited to any particular seal element 52 configurations. For example, in alternate embodiments, the seal element 52 may be configured as a compliant solid or hollow body ring seal, an annular gasket (e.g., a C-seal, a V-seal, a W-seal, an E-seal, etc.), a honeycomb ring, or a steel-wool or any other type of fibrous material ring.

Referring to FIG. 5, one or more of the clips 54 each extends circumferentially around the axis 60 between a clip first side 96 and a clip second side 98. Referring to FIGS. 2 and 5, one or more of the clips 54 may each be configured as a c-clip. One or more of the clips 54, for example, each includes an inner clamp portion 100, an outer clamp portion 102 and an intermediate spring portion 104. The spring portion 104 connects the inner clamp portion 100 to the outer clamp portion 102, and is adapted to bias the inner and the outer clamp portions 100 and 102 together. Referring to FIG. 2, the spring portion 104 may have an arcuate u-shaped cross-sectional geometry that defines a clip channel 106. The spring portion 104 may be formed integral with the first and/or the second clamp portions 100 and 102. The clamp and spring portions 100, 102 and 104, for example, may be bent and/or otherwise formed from a piece of sheet metal. The present invention, however, is not limited to any particular clip configurations and/or formation techniques.

During turbine engine 20 assembly, the clips 54 are mated with the tongue 78 to attach the seal element 52 to the second component 48. For example, the seal element 52 is arranged within each clip channel 106, and the tongue 78 is clamped between the inner and the outer clamp portions 100 and 102. Referring to FIG. 5, the clips 54 are arranged circumferentially around the axis 60. The first side 96 of each of the clips 54 is located next to the second side 98 of a respective adjacent one of the clips 54. For example, one or more of the clips 54 may each circumferentially engage one or more adjacent clips 54. Alternatively, a controlled leakage gap may extend circumferentially between one or more adjacent pairs of the clips 54. In this manner, the clips 54 may prevent the seal element 52 from dislocating during the assembly.

Referring to FIG. 2, upon attaching the seal element 52 to the second component 48 with the clips 54, the first component 46 may be mated with the second component 48. For example, the seal element 52 and the spring portion 104 of each clip 54 are arranged within the groove 64. The tongue 78 may be slid axially into the groove 64 until, for example, the flange second surface 74 engages the flange second surface 90. The flanges 58 and 80 may be connected together with one or more fasteners (not shown) in order to connect the first component 46 to the second component 48.

In the assembled configuration of FIG. 2, each inner clamp portion 100 engages (e.g., sealingly engages and/or otherwise contacts) the inner side tongue surface 84. Each outer clamp portion 102 engages the outer side tongue surface 86. The seal element 52 and the spring portion 104 of each clip 54 are axially arranged (e.g., compressed) between the first component 46 and the second component 48. The seal element 52 is axially engaged between the end tongue surface 82 and the spring portion 104 of each clip 54. The spring portion 104 of each clip 54 is axially engaged between the seal element 52 and the end groove surface 66. The spring portion 104 of each clip 54 may also radially engage the inner side groove surface 68. In this manner, the seal assembly 50 at least partially seals the gap between the first component 46 and the second component 48. More particularly, the seal element 52 and the spring portion 104 of each clip 54 at least partially seal the gap between the end tongue surface 82 and the end groove surface 66.

Figure 6:
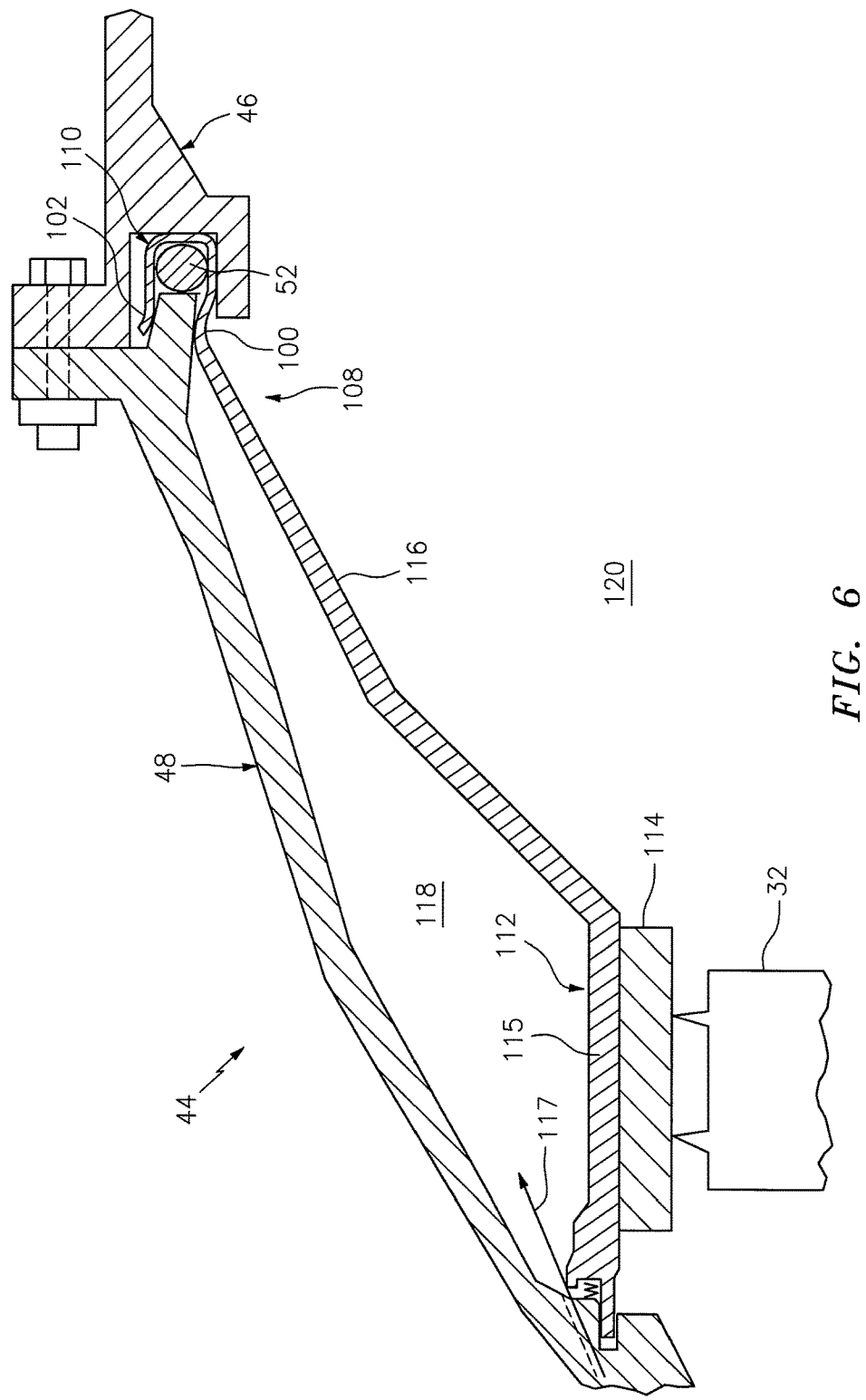
FIG. 6 is a side sectional illustration of the assembly of FIG. 2 configured with an alternate embodiment seal assembly.

FIG. 6 is a side sectional illustration of the assembly 44 configured with an alternate embodiment seal assembly 108. In contrast to the seal assembly 50 of FIG. 2, the seal assembly 108 also includes one or more alternate embodiment clips 110 and a turbine engine third component 112 such as, for example, a blade outer air seal (BOAS). The third component 112 is arranged radially within the second component 48. The third component 112 may include a plurality of circumferential abradable seal element segments 114, each of which is connected to a respective one of the clips 110. Each clip 110 may include, for example, an extension portion 116 that extends axially and/or radially between the inner clamping portion 100 and the seal element segment 114. The extension portion 116 may be formed integral with at least a portion 115 (e.g., a backing) of the third component 112. Alternatively, the extension portion 116 may be fastened (e.g., mechanically connected and/or otherwise bonded) to the third component 112. Still alternatively, the inner clamping portion 100 may be fastened directly to the third component 112.

During turbine engine 20 operation, cooling air 117 may be provided to a plenum 118 between the second component 48 and the third component 112. The seal assembly 108 may reduce (or substantially prevent) leakage of this cooling air 117 from the plenum 118 into a gas path 120 that extends axially through the components 46, 48 and 112. The seal assembly 108, for example, may define a tortuous leakage path, between the plenum 118 and the gas path 120, that extends around and weaves between the seal element 52, the clips 110 and the first and the second components 46 and 48.

One or more of the components of the assembly 44 may have various configurations other than those described above and illustrated in the drawings. For example, the seal element material 92 may be laid, woven and/or braded in various manners other than that illustrated in FIGS. 3 and 4. The seal element 52 may have a round or polygonal cross-sectional geometry. One or more of the clips 54, 110 may have a rectilinear and/or any other type of cross-sectional geometry. The seal assembly 50, 108 may include at least one clip with a substantially full hoop body to attach the seal element to the tongue. The assembly 44 may include various other turbine engine components other than those described above. The groove 64 may be configured as an annular channel as illustrated in FIG. 5, or alternatively an annular notch. One or more of the turbine engine components 46, 48 and 112 may each be configured as various types of turbine engine components other than a case or blade outer air seal. The first component 46, for example, may be configured as a duct extending between the rotors 32 and 34. The present invention therefore is not limited to any particular assembly component configurations.

The assembly 44 may be included in various land, air or sea based turbine engines other than the one described above. The assembly, for example, may be included in a geared turbine engine where a gear train connects one or more shafts to one or more rotors in a fan section, a compressor section and/or any other engine section. Alternatively, the assembly may be included in a turbine engine configured without a gear train. The assembly may be included in a geared or non-geared turbine engine configured with a single spool, with two spools, or with more than two spools. The turbine engine may be configured as a turbofan engine, a turbojet engine, a propfan engine, or any other type of turbine engine. The present invention therefore is not limited to any particular types or configurations of turbine engines.

The terms "axially", "radially", "inner" and "outer" are used to orientate the components of the assembly 44 described above relative to the turbine engine 20 and the axis 60. A person of skill in the art will recognize, however, one or more of these components may be utilized in other orientations than those described above. The present invention therefore is not limited to any particular assembly spatial orientations.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. An assembly for a turbine engine, comprising:
   a turbine engine first component including a groove and a groove surface;
   a turbine engine second component including a tongue that extends into the groove to a tongue surface; and
   a seal assembly at least partially sealing a gap between the groove surface and the tongue surface, the seal assembly including a rope seal and a clip that attaches the rope seal to the tongue;
   wherein the rope seal is arranged within the groove between the groove surface and the tongue surface, wherein a plurality of strands of seal element material are arranged together to form the rope seal, and wherein the rope seal and the clip extend circumferentially within the groove at least partially around an axis.

2. The assembly of claim 1, wherein
   the rope seal is engaged axially between the tongue surface and the clip; and
   the clip is engaged axially between the rope seal and the groove surface.

3. The assembly of claim 1, wherein
   the groove surface comprises an annular groove surface;
   the tongue surface comprises an annular tongue surface; and
   the rope seal comprises a substantially full hoop body.

4. The assembly of claim 3, wherein the clip comprises a substantially full hoop body.

5. The assembly of claim 3, wherein the clip is one of a plurality of clips that attach the rope seal to the tongue.

6. The assembly of claim 1, wherein the clip comprises a c-clip.

7. An assembly for a turbine engine, comprising:
a turbine engine first component including a groove and a groove surface;
a turbine engine second component including a tongue that extends into the groove to a tongue surface; and
a seal assembly at least partially sealing a gap between the groove surface and the tongue surface, the seal assembly including a rope seal and a clip that attaches the rope seal to the tongue;
wherein the rope seal is arranged within the groove between the groove surface and the tongue surface;
wherein a plurality of strands of seal element material are arranged together to form the rope seal;
wherein the clip includes a first clamp portion, a second clamp portion and a spring portion that connects the first clamp portion to the second clamp portion;
wherein the tongue is clamped between the first clamp portion and the second clamp portion;
wherein the rope seal is engaged between the tongue surface and the spring portion; and
wherein the spring portion is engaged between the rope seal and the groove surface.

8. The assembly of claim 7, wherein
the groove surface extends between opposing side groove surfaces; and
the spring portion engages one of the side groove surfaces.

9. The assembly of claim 7, further comprising a turbine engine third component connected to the first clamp portion.

10. The assembly of claim 9, wherein
the first component comprises a turbine engine first case;
the second component comprises a turbine engine second case; and
the third component comprises a blade outer air seal arranged within the second case.

* * * * *